(12) United States Patent
Luo et al.

(10) Patent No.: US 12,428,866 B1
(45) Date of Patent: Sep. 30, 2025

(54) AUTOMATIC POOL CLEANING APPARATUS

(71) Applicant: AIPER GLOBAL PTE. LTD., Singapore (SG)

(72) Inventors: Yangchun Luo, Shenzhen (CN); Yang Wang, Shenzhen (CN)

(73) Assignee: Aiper Global PTE. LTD., Singapore (SG)

( * ) Notice: Subject to any disclaimer, the term of this patent is extended or adjusted under 35 U.S.C. 154(b) by 0 days.

(21) Appl. No.: 19/241,270

(22) Filed: Jun. 17, 2025

Related U.S. Application Data

(63) Continuation of application No. 18/985,265, filed on Dec. 18, 2024.

(30) Foreign Application Priority Data

| Jan. 5, 2024 | (CN) | .............................. 202420033199 |
| Jan. 5, 2024 | (WO) | ................. PCT/CN2024/070980 |
| Sep. 5, 2024 | (CN) | .............................. 202422179324 |

(51) Int. Cl.
*E04H 4/16* (2006.01)
*C02F 1/00* (2023.01)
*C02F 103/42* (2006.01)

(52) U.S. Cl.
CPC ............ *E04H 4/1654* (2013.01); *C02F 1/001* (2013.01); *C02F 2103/42* (2013.01)

(58) Field of Classification Search
CPC ..... E04H 4/1654; C02F 1/001; C02F 2103/42
USPC ...... 210/143, 167.15, 167.16, 167.19, 167.2; 15/1.7
See application file for complete search history.

(56) References Cited

U.S. PATENT DOCUMENTS

| 2010/0065482 A1* | 3/2010 | Sumonthee | ............ E04H 4/1654 |
| | | | 210/167.16 |
| 2013/0061407 A1* | 3/2013 | Ben-Dov | .............. E04H 4/1636 |
| | | | 901/1 |
| 2013/0152317 A1* | 6/2013 | Erlich | ................... B01D 29/111 |
| | | | 15/1.7 |
| 2014/0014140 A1* | 1/2014 | Correa | ................... B01D 29/68 |
| | | | 134/34 |
| 2014/0076789 A1* | 3/2014 | Shlomi-Shlomi | ..... E04H 4/1209 |
| | | | 901/44 |

(Continued)

FOREIGN PATENT DOCUMENTS

| CN | 219151050 U | 6/2023 |
| CN | 116999943 A | 8/2023 |

(Continued)

OTHER PUBLICATIONS

Machine-generated English translation of DE 202013012915, generated on Jul. 17, 2025.*

(Continued)

*Primary Examiner* — Fred Prince
(74) *Attorney, Agent, or Firm* — Eschweiler & Potashnik, LLC; Ningjiao Zhang

(57) ABSTRACT

Disclosed is an automatic pool cleaning apparatus including a housing and a filter. The housing has a water inlet and a water outlet thereon, and includes inside a first chamber and at least one second chamber separated from the first chamber. The water inlet, the first chamber and the first water outlet are communicated to form a water flow channel on which the filter is configured.

28 Claims, 5 Drawing Sheets

(56) References Cited

U.S. PATENT DOCUMENTS

| | | | |
|---|---|---|---|
| 2015/0337556 A1* | 11/2015 | Shlomi-Shlomi | E04H 4/1654 210/167.16 |
| 2018/0328062 A1* | 11/2018 | Ortiz | E04H 4/1654 |
| 2019/0040642 A1* | 2/2019 | Michelon | E04H 4/1654 |
| 2020/0270891 A1* | 8/2020 | Pichon | E04H 4/1654 |
| 2021/0198913 A1* | 7/2021 | Michelon | E04H 4/1654 |
| 2021/0301546 A1* | 9/2021 | Hardin | E04H 1/1205 |
| 2024/0376737 A1* | 11/2024 | Wang | G01B 21/00 |
| 2025/0067075 A1 | 2/2025 | Wang | |
| 2025/0146315 A1 | 5/2025 | Wang | |

FOREIGN PATENT DOCUMENTS

| | | | | |
|---|---|---|---|---|
| CN | 117323733 A | | 1/2024 | |
| DE | 202013012915 U1 * | | 11/2021 | ........... E04H 4/1654 |
| EP | 2821564 A2 * | | 1/2015 | ............ E04H 4/1654 |
| ES | 2307994 T3 * | | 12/2008 | ........... E04H 4/1654 |
| WO | 2024222493 | | 4/2024 | |
| WO | 2024165001 | | 8/2024 | |
| WO | 2024169737 | | 8/2024 | |
| WO | 2024174474 | | 8/2024 | |
| WO | 2024174864 | | 8/2024 | |
| WO | 2024222138 | | 10/2024 | |
| WO | 2024222910 | | 10/2024 | |
| WO | 2025050452 | | 3/2025 | |

OTHER PUBLICATIONS

Machine-generated English translation of ES 2307994, generated on Jul. 17, 2025.*

* cited by examiner

AUTOMATIC POOL CLEANING APPARATUS

CROSS-REFERENCE

The present Application is a Continuation of application Ser. No. 18/985,265 filed on Dec. 18, 2024, which claims benefits of, and priorities to Chinese Application No. 202420033199.7 filed on Jan. 5, 2024, PCT Application No. PCT/CN2024/070980 filed on Jan. 5, 2024, and Chinese Application No. 202422179324.8 filed on Sep. 5, 2024, the disclosures of which are hereby expressly incorporated by reference herein in their entireties.

TECHNICAL FIELD

The present disclosure relates to an automatic pool cleaning apparatus in a field of automatic cleaning.

BACKGROUND

An automatic pool cleaning apparatus may be utilized to automatically clean pool facilities such as swimming pools. For example, for an automatic pool cleaning apparatus in a pool, its water flow conveying component including a water pump may operate to make the water in the pool to flow into the automatic pool cleaning apparatus, and to be discharged back into the pool after being filtered by a filter in the automatic pool cleaning apparatus. Thus, the pool may be cleaned.

SUMMARY

Disclosed is an automatic pool cleaning apparatus comprising a housing and a filter. The housing has a water inlet and a first water outlet thereon, and comprises inside a first chamber and at least one second chamber separated from the first chamber. The water inlet, the first chamber and the first water outlet are communicated to form a water flow channel; and the filter is configured on the water flow channel.

In one or more embodiments, the automatic pool cleaning apparatus may further include a separator configured inside the housing, the first chamber corresponding to an inner space surrounded by the separator or by at least one side of the separator and a part of an inwall of the housing.

In one or more embodiments, the separator is at least partially integrated with an inwall of the housing.

In one or more embodiments, the automatic pool cleaning apparatus may further include at least one partition plate configured inside the housing. The at least one partition plate contacts against the inwall of the housing and separates the first chamber inside the housing.

In one or more embodiments, at least one side of the filter contacts against the inwall of the housing and separates the first chamber inside the housing.

In one or more embodiments, the filter comprises a filter box and a container for accommodating the filter box, and at least one side of the container contacts against the inwall of the housing and separates the first chamber inside the housing.

In one or more embodiments, the filter comprises a filter box and a container for accommodating the filter box. The container has a first side plate, and at least one partition plate is configured on the inwall of the housing. The at least one partition plate contacts against the first side plate and separates the first chamber inside the housing.

In one or more embodiments, the at least one partition plate contacts against at least one first side of the container different from a second side of the container where a main part of the first side plate is located.

In one or more embodiments, the pool automatic cleaning apparatus may further include at least one part different from the filter and in the at least one second chamber. At least one side of the at least one part contacts against the inwall of the housing and separates the first chamber inside the housing.

In one or more embodiments, at least one second water outlet is further configured on the housing, the first chamber has at least one first opening, and the at least one first opening corresponds to or is communicated with the at least one second water outlet.

In one or more embodiments, a one-way valve is configured on the at least one second water outlet and/or the at least one first opening.

In one or more embodiments, the at least one second water outlet is on a bottom and/or a side of the housing.

In one or more embodiments, the at least one first opening on a bottom and/or a side of the first chamber.

In one or more embodiments, a second opening is configured at the bottom of the first chamber, and the second opening corresponds to or is communicated with the water inlet.

In one or more embodiments, the second opening is communicated with the water inlet via a water flow guiding pipe.

In one or more embodiments, at least a part of the water flow guiding pipe is outside the first chamber.

In one or more embodiments, the filter has a third opening corresponding to or being communicated with the second opening.

In one or more embodiments, the automatic pool cleaning apparatus may further comprise a drainage, at least a part of which is configured in the at least one second chamber. The drainage is configured to guide the incoming water flow to flow out from the first water outlet via the water flow channel. The first chamber has at least one fourth opening for forming the water flow channel.

In one or more embodiments, at least a part of the drainage and/or a water discharging direction of the drainage face to the first water outlet.

In one or more embodiments, the first water outlet is located at a top and/or a side of the at least one second chamber.

In one or more embodiments, at least a part of the drainage faces the at least one fourth opening.

In one or more embodiments, the drainage includes a pump and a paddle.

In one or more embodiments, the automatic pool cleaning apparatus may further include a power supply and a controller, both of which are configured in the at least one second chamber.

In one or more embodiments, the second chamber accommodating the power supply is located at the lower part of the first chamber.

In one or more embodiments, a distance between the filter and the inwall of the first chamber is less than 35 millimeters.

DETAILED DESCRIPTION

Figure 1:
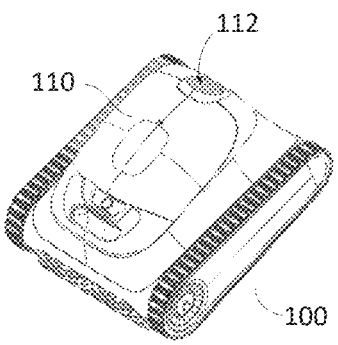
FIG. 1 is a schematic diagram show a structure of an exemplary automatic pool cleaning apparatus in a first embodiment.

Embodiments of the present disclosure will be described hereinafter in detail with reference to accompany drawings. In the drawings, the same reference numbers will be assigned to the same or equivalent parts for which descriptions will not be repeated.

For example, a power of the water flow conveying component may be increased to increase a circulating speed of water flow, so that a cleaning efficiency may be improved. However, energy consumption of the pool automatic cleaning apparatus may also increase accordingly, and the endurance of the pool automatic cleaning apparatus underwater may be affected. Thus, it is expected to reduce energy consumption and to ensure or further improve the cleaning efficiency of the automatic pool cleaning apparatus.

In various embodiments, the housing of the automatic pool cleaning apparatus has inside a first chamber and at least one second chamber separated from the first chamber, wherein the first chamber, a water inlet, and a water outlet on the housing are communicated and form a water flow channel, so that water in the pool may enter the first chamber from the water inlet and may be discharged from the water outlet after being filtered and cleaned by a filter configured on the water flow channel. The space capacity of the first chamber is less than the total capacity of the inner space of the housing, so that the water flow entering the body of the apparatus from the water inlet may be restrained by the first chamber, thereby reducing the disorder degree of the water flow, and further reducing the fluid resistance, so that the water flow conveying components in the apparatus may convey the water flow with lower energy consumption. Therefore, for example, the energy consumption of the automatic pool cleaning apparatus may be reduced, the endurance performance may be improved, and the cleaning efficiency of the apparatus may be ensured or further improved.

First Embodiment

FIGS. 1 to 5 show an exemplary automatic pool cleaning apparatus 100 in the first embodiment, which is also referred to as "apparatus 100" hereafter.

As shown in the figures, the apparatus 100 may include a housing 110 and a filter 120. The housing 110 has a water inlet 111 and a water outlet 112 thereon, and an inner space of the housing 110 includes a chamber 130, together with chambers 140, 150 separated from the chamber 130. The water inlet 111, the chamber 130 and the water outlet 112 are communicated to form a water flow channel. The filter 120 is configured on the water flow channel, for example, is configured in the chamber 130.

A drainage 160 may be configured in the chamber 140 separated from the chamber 130. The drainage 160, as one of the water flow conveying components inside the apparatus 100, is configured to guide water entering the chamber 130 from the water inlet 111 to flow out from the water outlet 112.

In the chamber 150 separated from the chamber 130, one or more another parts, such as a power supply and a controller, may be configured.

By separating the chamber 130 inside the housing 110, having the water inlet 111, the chamber 130 and the water outlet communicated to form a water flow channel, and configuring the filter 120 on the water flow channel, the water in the pool may flow into the chamber 130 from the water inlet 111 and may be discharged from the water outlet 112 after being filtered and cleaned by the filter 120 configured on the water flow channel. A space capacity of the chamber 130 is smaller than a total capacity of the inner space of the housing 110, and thus the water flowing into the inside of the apparatus 100 from the water inlet 111 may be restrained by the chamber 130, so that a disorder degree of the water flow and in turn a fluid resistance may be reduced. Accordingly, the drainage 160, as one of the water flow conveying components in the apparatus 100, may convey the water flow with lower energy consumption. Thus, for example, the energy consumption of the apparatus 100 may be reduced, the endurance performance may be improved, and the cleaning efficiency of the apparatus may be ensured or further improved.

Further, it is usually necessary to take the filter 120 out of the apparatus 100 periodically or irregularly, to clean the dirt or garbage filtered or intercepted by the filter 120. By separating the chamber 130 in the housing 110, configuring the filter 120 in the chamber 130, and configuring the other parts, such as the drainage 160, the power supply and the controller, in the chambers 140 and/or 150 separated from the chamber 130, for example, an internal structure of the apparatus 100 may become more regular and beautiful visually.

In this embodiment, the chamber 130 may be separated inside the housing 110 in any suitable manners.

For example, the chamber 130 may be separated inside the housing 110 by at least one partition plate configured in the housing 110. The manner of separating the chamber 130 inside the housing 110 by at least one partition plate is simple and may facilitate to reduce a weight of the apparatus 100.

Further, the filter 120 may be utilized to separate the chamber 130 inside the housing 110. For example, at least one side of the filter 120 may be configured to contact against the inwall of the housing 110, thereby separating the chamber 130 inside the housing 110 and positioning the filter 120 in the chamber 130.

Further, the chamber 130 may be separated inside the housing 110 by at least one part different from the filter 120, such as the drainage 160, the power supply and the controller. For example, at least one side of at least one part different from the filter 120, such as the drainage 160, the power supply and the controller, may be configured to contact against the inwall of the housing 110, thereby separating the chamber 130 inside the housing 110. Then, such at least one part may be configured in the chambers 140 and/or 150, and the filter 120 may be configured in the chamber 130.

By separating the chamber 130 inside the housing 110 with parts in the apparatus 100, such as the filter 120, the drainage 160, the power supply and the controller, it is unnecessary to configure a dedicated separation part or separator, for example, an arrangement of various parts in the apparatus 100 may be more compact, which is beneficial to reducing a volume of the apparatus 100.

Figure 2:
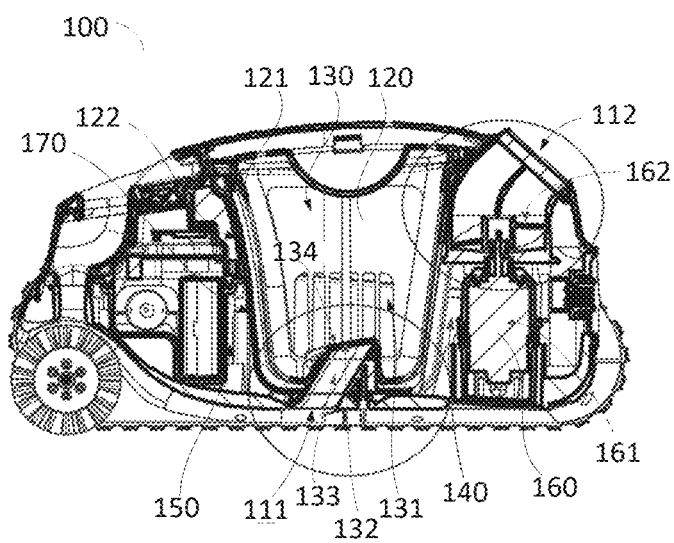
FIG. 2 is a sectional view showing the exemplary automatic pool cleaning apparatus in the first embodiment.
Figure 3:
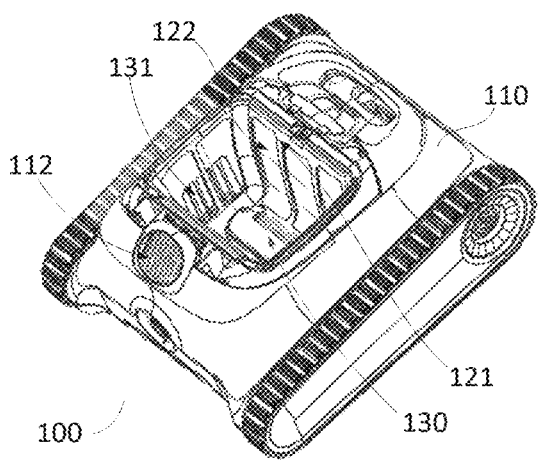
FIG. 3 is a schematic diagram showing a structure of the exemplary automatic pool cleaning apparatus in the first embodiment, with its top cover removed.
Figure 4:
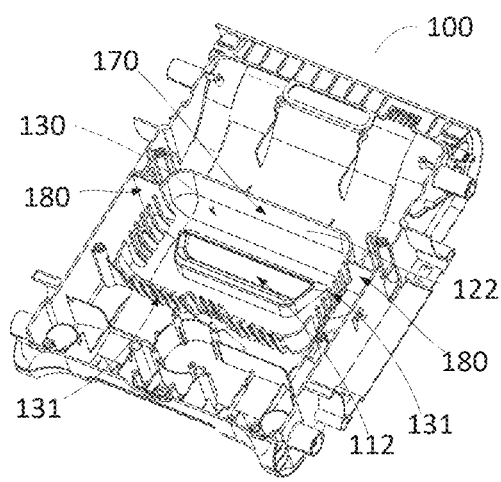
FIG. 4 is a schematic diagram showing a partial internal structure of the exemplary automatic pool cleaning apparatus in the first embodiment.

For example, as shown in FIGS. 2 to 4, the filter 120 may include a filter box 121 and a container 122 for accommodating the filter box 121, wherein, for example, a shape of the container 122 may be configured into a box shape, and at least one side of the container 122 may be configured to contact against the inwall of the housing 110, thereby separating the chamber 130 inside the housing 110.

Further, the container 122 may also be independent of the filter 120 and may serve as an independent separator, so that an inner space surrounded by the container 122 or by at least one side of the container 122 and a part of the inwall of the housing 110 corresponds to the chamber 130. Such container 122 may be detachable from the inner space of the housing 110, or may be at least partially integrated with the housing 110.

As shown in FIGS. 2 and 4, a partition plate 170 may be configured on at least one side of the container 122 to separate the chamber 130 inside the housing 110.

Further, for example, as shown in FIG. 4, at least one partition plate 180 may be configured on the inwall of the housing 110, and the at least one partition plate 180 may be configured to contact against the partition plate 170 on at least one side of the container 122, thereby separating the chamber 130 inside the housing 110.

For example, the at least one partition plate 180 may be configured to contact against at least one side of the container 122 after arranging the container 122 into the housing 110, wherein the at least one side may be different from the side where the partition plate 170 is configured on the container 122. Thus, a better design for disassembly may be achieved with a simple separator, and a better separation may be obtained.

As shown in FIG. 4, the at least one partition plate 180 may include two partition plates respectively configured on two sides of the container 122, and the two partition plates may respectively contact and fit tightly two sides which are adjacent to the partition plate 170 of the container 122 and opposite to each other. In another example, the number of the at least one partition plate 180 may be increased or reduced.

As shown in FIG. 2, an opening 132 may be configured on a bottom of the chamber 130, and may be communicated with the water inlet 111 via a water flow guiding pipe 133. By configuring the water flow guiding pipe 133, for example, the water outside the apparatus 100 may be introduced into the chamber 130 in a more concentrated and directional manner, so that the degree of water flow disorder may be further reduced and the fluid resistance may be reduced.

Further, as shown in FIG. 2, at least a part of the water flow guiding pipe 133 is outside the chamber 130. For example, a length of the water flow guiding pipe 133 outside the chamber 130 may be 1 cm, 3 cm, 5 cm or any other suitable value (including values less than 1 cm or more than 5 cm). Thus, for example, a gap may be allowed between the bottom of the chamber 130 and the bottom (chassis) of the housing 110 while normally guiding the water flow, without making the bottom of the chamber 130 and the bottom of the housing 110 close to each other or even sticking together. Thus, for example, a size of the gap between the bottom of the chamber 130 and the bottom of the housing 110 may be determined as required, which is conducive to improving the design flexibility and satisfying different design requirements on the inner space of the apparatus.

The water flow guiding pipe 133 may be integrally formed with the housing 110, or may be integrally formed with the chamber 130 or the container 122 for forming the chamber 130, or may be configured as an independent component.

Depending on a combination mode of respective components/parts in the apparatus 100, for example, the water inlet of the apparatus 100 may be the water inlet 111, or a combination of the water inlet 111 and the water flow guiding pipe 133, or a combination of the water inlet 111, the water flow guiding pipe 133 and the opening 132; and the bottom opening of the chamber 130 or the container 122 may be an opening 132, or a combination of a water flow guiding pipe 133 and the opening 132, or a combination of a water inlet 111, a water flow guiding pipe 133 and the opening 132.

For example, in a case where the filter 120 is independent of the chamber 130, an opening 134 may be configured on the filter 120, for example, at the bottom of the container 122 and/or the filter box 121, and the opening 134 may be communicated with the opening 132. For example, the opening 134 may be engaged with the opening 132, or may be communicated through another water flow guiding pipe. For example, in a case where the inner space of the filter 120 corresponds to the chamber 130, for example, in a case where the chamber 130 is separated by the filter 120, the opening 134 and the opening 132 may be the same opening.

As shown in FIGS. 2 to 4, at least one opening 131 may be configured on at least one side of the chamber 130 or the container 122 for forming the chamber 130, so that the chamber 130 and the chamber 140 may be communicated via the at least one opening 131. Thus, the water filtered by the filter 120 in the chamber 130 may quickly flow into the chamber 140 accommodating the drainage 160 through the at least one opening 131, and then may be discharged from the water outlet 112 through the drainage 160, so that, for example, a filtering speed of water may be improved.

As shown in FIG. 2, the water outlet 112 may be configured at the top of the chamber 140. The water outlet 112 may also be configured on at least one of the top and the side of the chamber 140.

At least a part of the drainage 160 in the chamber 140 and/or the water discharging direction of the drainage 160 may face to (e.g., front straight onto) the water outlet 112. Further, at least a part of the drainage 160 in the chamber 140 may face to (e.g., front straight onto) at least one opening 131.

For example, the drainage 160 may include a pump 161 and paddles 162. In a case where the drainage 160 is vertically configured in the chamber 140, a part below the paddles 162 may face to at least a part of the opening 131, so that the water discharging direction of the paddle 162 may face to the water outlet 112. Thus, for example, the water in the chamber 130 may quickly enter the chamber 140 through the at least one opening 131 after being filtered by the filter 120, and may be quickly discharged from the water outlet 112 through the drainage 160.

Further, a distance between the filter 120 (for example, the filter box 121 of the filter 120) and the inwall of the chamber 130 (for example, at least one opening 131 on the chamber 130) may be less than 35 millimeters. Further, a distance between the drainage 160 in the chamber 140 and the filter 120 or at least one opening 131 on the chamber 130 may be less than 35 millimeters. Thus, for example, the water in the chamber 130 may enter the chamber 140 through the at least one opening 131 more quickly after being filtered by the filter 120, and may be discharged from the water outlet 112 more quickly through the drainage 160.

The operating power of the drainage 160 may be determined according to the volume of the chamber 130 and/or the chamber 140, so that the operating power of the drainage 160 may be matched with the volumes of the chamber 130 and/or the chamber 140, to ensure that the drainage 160 may provide sufficient drainage force in the normal operating mode while avoiding excessive energy consumption.

Further, in this embodiment, the chamber 130 and the chamber 150 may or may not be completely isolated, if it may be ensured that most of the water entering the apparatus 100 from the water inlet 111 flows in the chamber 130 and flows out from the water outlet 112 after being filtered by the filter 120. Further, as required, the chamber 150 may also be configured to be communicated with an external environment of the apparatus 100, so that water may enter the chamber 150.

Figure 5:
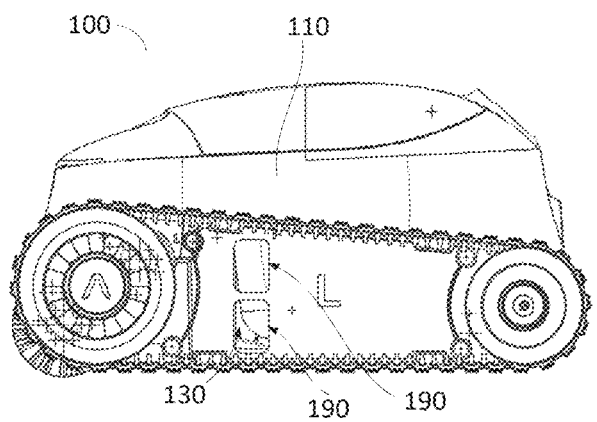
FIG. 5 is a front view showing the exemplary automatic pool cleaning apparatus in the first embodiment, with its side cover removed.
Figure 6:
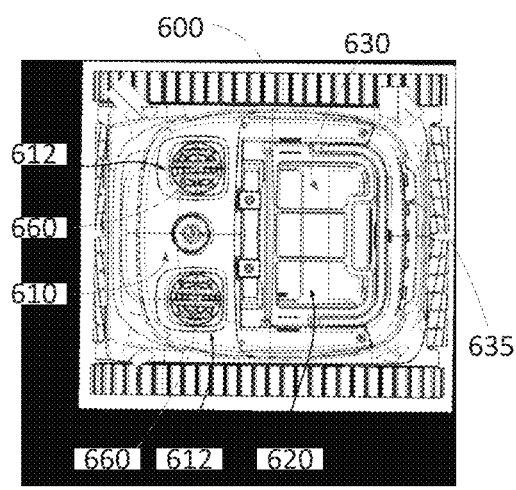
FIG. 6 is a top view showing a partial structure of an exemplary automatic pool cleaning apparatus in a second embodiment.
Figure 7:
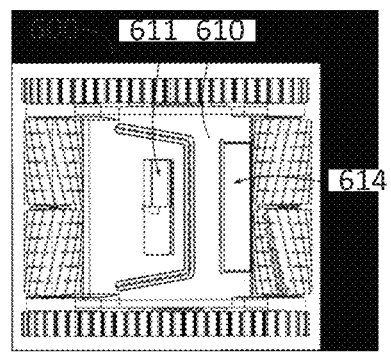
FIG. 7 is a bottom view showing a partial structure of the exemplary automatic pool cleaning apparatus in the second embodiment.
Figure 8:
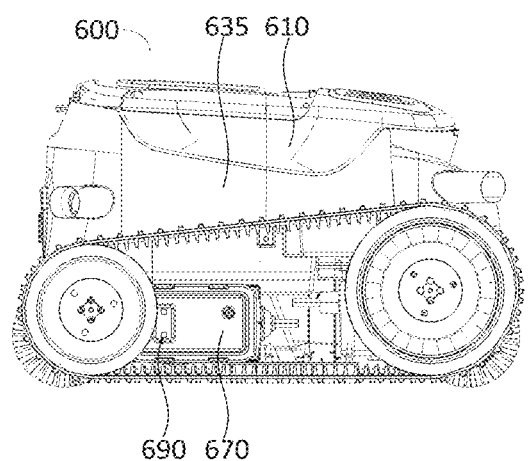
FIG. 8 is a rear view showing a partial structure of the exemplary automatic pool cleaning apparatus in the second embodiment.

Further, in this embodiment, as shown in FIG. 5, at least one water outlet 190 may be configured at a side of the housing 110. For example, at least a part of the at least one opening 131 on the chamber 130 (for example, at least one opening 131 at two sides of the chamber 130) may also correspond to or be communicated with the at least one water outlet 190.

For example, the opening and closing of at least one water outlet 190 may be controlled in an electric control manner. For example, in a case where the apparatus 100 floats up or is fished out of the water, the at least one water outlet 190 may be controlled to open, so that the water in the chamber 130 may be quickly discharged to the outside of the apparatus 100 through at least one opening 131 and at least one water outlet 190, and the water in the chambers 140 and 150 may be quickly discharged to the outside of the apparatus 100 through the at least one water outlet 190. Thus, an overall weight of the apparatus 100 may be reduced, so that the apparatus 100 may float up or be fished out.

For example, the at least one water outlet 190 may be in front of the water inlet 111, so that the water in the chamber 130 and/or the chambers 140 and 150 may be quickly discharged from the at least one water outlet 190 when the at least one water outlet 190 is exposed out of the water at an end. Further, when the apparatus 100 is underwater, the at least one water outlet 190 may also assist the water inlet 111 to feed water, so that the apparatus 100 may sink quickly.

Second Embodiment

FIGS. 6 to 11 show an exemplary automatic pool cleaning apparatus 600 in the second embodiment, which is also referred to as "apparatus 600" hereafter.

As shown in the figures, the apparatus 600 may include a housing 610 and a filter 620. The housing 610 has a water inlet 611 and a water outlet 612 thereon. A separator 635 (e.g., a frame structure, etc.) is further configured inside the housing 610, which may be at least partially integrated with the housing 110, or may be configured as an independent structure and arranged inside the housing 110. Then, the chamber 630 may be separated inside the housing 610 by the separator 635. The water inlet 611, the chamber 630 and the water outlet 612 are communicated to form a water flow channel (see the dashed arrow in FIG. 9), and the filter 620 is configured on the water flow channel, for example, in the chamber 630.

In the housing 610, in addition to the chamber 630, at least one chamber 640, 650 separated from the chamber 630 may be configured to accommodate at least one another part different from the filter 620.

For example, the apparatus 600 may include a drainage 660 as one of the water flow conveying components inside the apparatus 600, for guiding the water entering the chamber 630 from the water inlet 611 to flow out from the water outlet 612. The drainage 660 may include a pump 661 and paddles 662. For example, the paddles 662 may be configured in the chamber 640 and the drain pump 661 may be configured in the chamber 650. The whole of the drainage 660 may also be configured in the chamber 640. Further, the drainage 660 may also include a guide hood (or a dome) and a pressure hood to facilitate the diversion and increase the pressure, so that the water may be smoothly discharged from the water outlet 612 against the resistance and gravity of the water.

Figure 9:
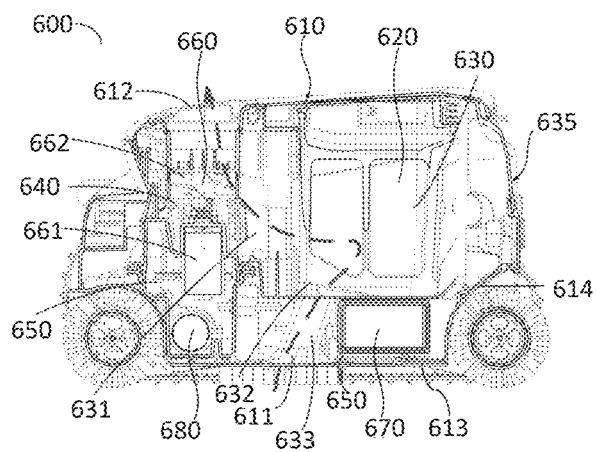
FIG. 9 is a sectional view showing the exemplary automatic pool cleaning apparatus in the second embodiment.
Figure 10:
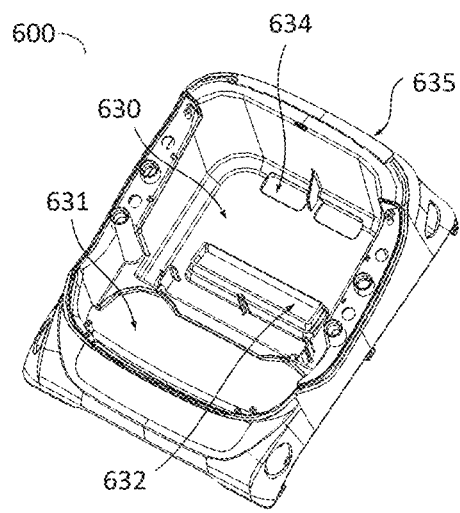
FIG. 10 is a schematic diagram showing a structure of a partition assembly of the exemplary automatic pool cleaning apparatus in the second embodiment.
Figure 11:
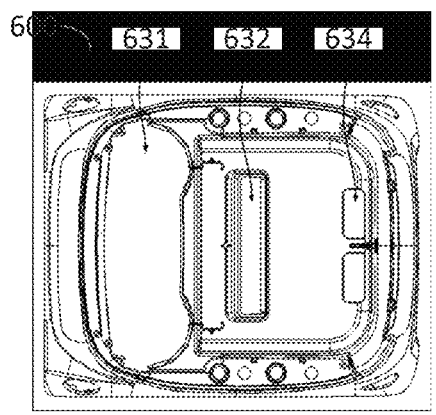
FIG. 11 is a top view showing a structure of the partition assembly of the exemplary automatic pool cleaning apparatus in the second embodiment.
Figure 12:
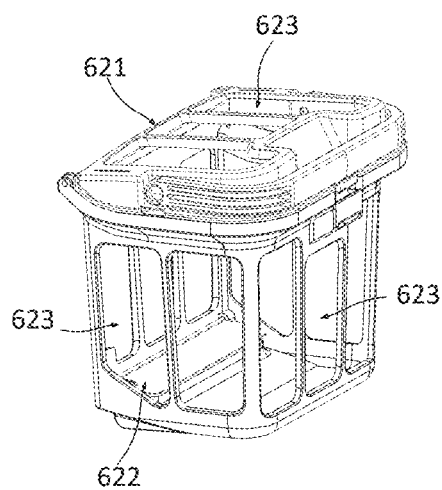
FIG. 12 is a structural schematic diagram showing a filter box of the exemplary automatic pool cleaning apparatus in the second embodiment.

For example, the apparatus 600 may further include one or more other parts such as a power supply 670, a driver and/or controller 680, and the one or more parts may be configured in at least one chamber 650 separated from the chamber 630. For example, as shown in FIG. 9, the chamber 650 accommodating the power supply 670 may be lower than the chamber 630, so that, for example, it is beneficial to make a center of gravity of the apparatus 600 at or near a desired position such as the middle of the apparatus 600, thereby facilitating control and enabling the apparatus 600 to move more stably.

When the apparatus 600 works in water, the water in the pool may flow into the chamber 630 from the water inlet 611 of the housing 610, be filtered by the filter 620 on the water flow channel, be extracted from the chamber 630 by the drainage 660, and be discharged to the outside of the apparatus 600 through the water outlet 612.

By separating the chamber 630 inside the housing 610, making the water inlet 611, the chamber 130 and the water outlet 612 to be communicated to form a water flow channel, and configuring the filter 620 on the water flow channel, the water in the pool may enter the chamber 630 from the water inlet 611, and may be discharged from the water outlet 612 after being filtered and cleaned by the filter 620 configured on the water flow channel. The space capacity of the chamber 630 is smaller than the total capacity of the inner space of the housing 610, and thus the water flowing into the fuselage of the apparatus 600 from the water inlet 611 may be restrained by the chamber 630, thereby reducing the disorder degree of the water flow and further reducing the fluid resistance, so that the drainage 660, as one of the water flow conveying components in the apparatus 600, may convey the water flow with lower energy consumption. Thus, for example, the energy consumption of the apparatus 600 may be reduced, the endurance performance may be improved, and the cleaning efficiency of the apparatus may be ensured or further improved.

Further, it is usually necessary to take the filter 620 out of the apparatus 600 periodically or irregularly, to clean the dirt or garbage filtered or intercepted by the filter 620. By separating the chamber 630 inside the housing 610, configuring the filter 620 in the chamber 630, and configuring other parts such as the water drainage 660, the power supply 670, the driver and/or controller 680 in the chambers 640 and/or 650 separated from the chamber 630, for example, the internal structure of the apparatus 600 may become more regular and beautiful visually.

In this embodiment, an opening 632 may be configured on the separator 635 or the chamber 630, for example, at the bottom of the separator 635 or the chamber 630, so that the filter 620 may be communicated with the water inlet 611 through the opening 632. For example, the opening 632 may be communicated with the water inlet 611 via a water flow guiding pipe 633. The water flow guiding pipe 633 may be integrally formed with the housing 610, or may be integrally formed with the separator 635 or the chamber 630, or may be configured as an independent component. By configuring the water flow guiding pipe 633, for example, the water outside the apparatus 600 may be introduced into the chamber 630 in a more concentrated and directional manner, so that the degree of water flow disorder may be further reduced and the fluid resistance may be reduced.

Further, like the water flow guiding pipe 133 in the above first embodiment, at least a part of the water flow guiding pipe 633 is outside the chamber 630. For example, the length of the water flow guiding pipe 633 outside the chamber 630 may be 1 cm, 3 cm, 5 cm or any other suitable value (including values less than 1 cm or more than 5 cm). Thus, for example, a gap may be allowed between the bottom of the chamber 630 and the bottom (chassis) of the housing 610 while normally guiding the water flow, without making the bottom of the chamber 630 and the bottom of the housing 610 close to each other or even sticking together. Thus, for example, the size of the gap between the bottom of the chamber 630 and the bottom of the housing 610 may be determined as needed, which is conducive to improving the design flexibility and satisfying different design requirements on the inner space of the apparatus.

Further, an opening 631 may be further provided on at least one side of the separator 635, so that the chamber 630 and the chamber 640 are communicated via the at least one opening 631. Thus, the water filtered by the filter 620 in the chamber 630 may quickly flow into the chamber 640 accommodating at least a part of the drainage 660 through the at least one opening 631, and then be discharged from the water outlet 612 through the drainage 660, so that, for example, the filtering speed of water may be improved.

The filter 620 includes a filter box 621. An opening 622 and an opening 623 may be configured on the filter box 621.

For example, the opening 622 may be communicated with the opening 632, and may further be communicated with the water inlet 611, so that water flowing into the interior of the housing 610 from the water inlet 611 may enter the chamber 630 through the opening 632, and then enter the filter box 621 of the filter 620 through the opening 622.

For example, a filter component (e.g., a filter screen or filtering net) may be formed on the opening 623, and may be communicated with the opening 631, so that the water in the filter box 621 may be filtered at the opening 623, flow into the chamber 640 from the chamber 630 through the opening 631, and then be discharged from the water outlet 612 to the outside of the apparatus 600 by the drainage 660.

In this embodiment, the water entering the chamber 630 enters the chamber 640 after being filtered by the filter 620, and then is discharged from the water outlet 612 by the drainage 660. By separating the chamber 630 inside the apparatus 600, an escape space of water may be defined, so that water may mainly move in the chamber 630, thereby reducing the water flow resistance, saving the energy consumption of the drainage 660 and improving the endurance of the apparatus 600.

Further, by arranging parts such as the power supply 670 and the driver and/or controller 680 in the chamber 650, these parts may be protected, a probability of failures of these parts due to water ingress or humidity may be reduced, the normal operation of the apparatus 600 may be ensured, and at the same time, the cleanliness of these parts may be ensured as much as possible.

In this embodiment, the chamber 630 is enclosed inside the housing 610 directly by the separator 635, and a communication among the water inlet 611, the chamber 630, the filter 620, the drainage 660 and the water outlet 612 is realized by configuring openings on the separator 635, and a water flow channel is formed in the housing 610 of the apparatus 600.

Further, one or more partition plates may be configured inside the housing 610, which may contact against the inwall of the housing 610, so that the chamber 630 is separated inside the housing 110.

Further, instead of the separator 635, at least one side of the filter 620 may be configured as an at least partially closed plate structure, so that after the filter 620 is arranged into the housing 610, the side of the filter 620 configured with the plate structure may contact against the inwall of the housing 610, thereby separating the chamber 630 in the inner space of the housing 610.

Further, instead of the separator 635, at least one side of at least one part different from the filter 620, such as the drainage 660, the power supply 670, and the driver and/or controller 680, may contact against the inwall of the housing 610, so that the chambers 630, 640, 650 and the like may be separated inside the housing 610. For example, one side of the chamber 630 may be formed by sides of at least one part such as the drainage 660, the power supply 670, the driver and/or controller 680, and the other sides and the top and bottom surfaces of the chamber 630 may be formed by a part of the housing 610.

Components/parts, such as the power supply 670, the driver and/or controller 680 and the like, may be configured in the chamber 650. Thereby, for example, protection of parts such as the power supply 670, the driver and/or controller 680 may be enhanced.

The filter 620 may be configured in the chamber 630, and at least a part of the drainage 660 may be configured in the chamber 640 which is communicated with the chamber 630. For example, the distance between the filter 620 and the side of the separator 635 or the drainage 660 facing the filter 620 may be less than 35 millimeters. In this way, the distance of the pumped water flow of the drainage 660 may be shorter. Thus, the fluid resistance may be reduced, and the power consumption of the drainage 660 may be reduced, thereby improving the endurance of the apparatus 600.

The filter 620 may include at least one filter box 621. For example, by providing a plurality of filter boxes 621, a multi-stage filtration may be realized, thereby improving the cleaning performance of the apparatus 600. For example, at the upper end of each filter box 621, a handle may be configured to facilitate lifting and moving the filter box.

For example, an annular platform may be configured in the chamber 630, and protrusions are configured on peripheral sides of the filter box 621, so that when the filter box 621 is inserted into the annular platform of the chamber 630, the protrusions on the peripheral sides of the filter box 621 may abut against the annular platform, and the filter box 621 may be installed in the chamber 630 through a cooperation of the annular platform and the protrusions. Further, a container matching the shape of the filter box 621 may be configured in the separator 635, and the filter box 621 may be placed in the container.

Further, an opening 634 may be configured on the chamber 630 or on the separator 635 for forming the chamber 630, for example, at the bottom and/or side of the separator 635. For example, the opening 634 may be configured at an end of the separator 635 away from the drainage 660. Meanwhile, at least one another water outlet may be configured on the housing 610, for example, a water outlet 613 may be configured at the bottom of the housing 610, and/or a water outlet 614 may be configured at the side of the housing 610 (for example, at the lowest center of gravity after the apparatus 600 is lifted vertically, or above a rear roller brush of the apparatus 600), and the opening 634 may be communicated with the water outlets 613 and/or 614.

Thus, when the apparatus 600 is taken out of the pool, the water in the chamber 630 may flow out quickly, by its own gravity, through the opening 634, the water outlet 613 and/or 614, thereby improving the drainage speed of the apparatus 600.

For example, at least one of the water outlet 613, the water outlet 614 and the opening 634 may be configured with an opening and closing mechanism, which may be sealingly engaged with the opening 634 or the water outlet 613 and/or 614, such as a one-way valve, a pivoting baffle, a gland, a door panel or a sliding door, and a lifting gate. The opening and closing mechanism, such as a one-way valve, may be configured to open when the apparatus 600 leaves the pool, for example, by its own gravity or other transmission mechanisms, so that the water in the apparatus 600 may be quickly discharged through the opening 634, the water outlets 613 and/or 614, and to close when the apparatus 600 is in the pool, for example, by buoyancy or water pressure, thereby closing the drainage channel between the opening 634 and the water outlets 613 and/or 614, so as to prevent external water from entering the apparatus 600.

For example, the opening and closing of the opening and closing mechanism may also be controlled based on depth information of the apparatus 600. For example, the depth information of the apparatus 600 may be detected by a detector for leaving water, which may be further configured to check whether the apparatus 600 is out of water. In a case of a detection that the apparatus 600 is out of water, the opening and closing mechanism may be controlled to open, otherwise, to close.

For example, the detector for leaving water may include at least one sensor such as a Hall sensor, a water immersion sensor and a power sensor.

For example, in the case where the detector for leaving water includes a power sensor, the power of the power mechanism of the apparatus 600 is reduced in the case where the apparatus 600 leaves water, and accordingly, the sensed data from the power sensor about the power of the power mechanism of the apparatus 600 may be used to determine whether the apparatus 600 is out of water.

For example, the detector for leaving water may include an electrode type water immersion sensor, which may include two electrode pads 690 configured near the bottom of the rear end of the apparatus 600. After any of the electrode pads 690 leaves the water, the passage formed by the two electrode pads 690 is disconnected, and it may be determined that the apparatus 600 leaves the water, and then the opening and closing mechanism may be controlled to open the drainage channel between the opening 634 and the water outlets 613 and/or 614, to realize rapid drainage. Further, the detector for leaving water may also include other types of water immersion sensors such as heat-sensitive water immersion sensors and optical water immersion sensors.

Third Embodiment

Figure 13:
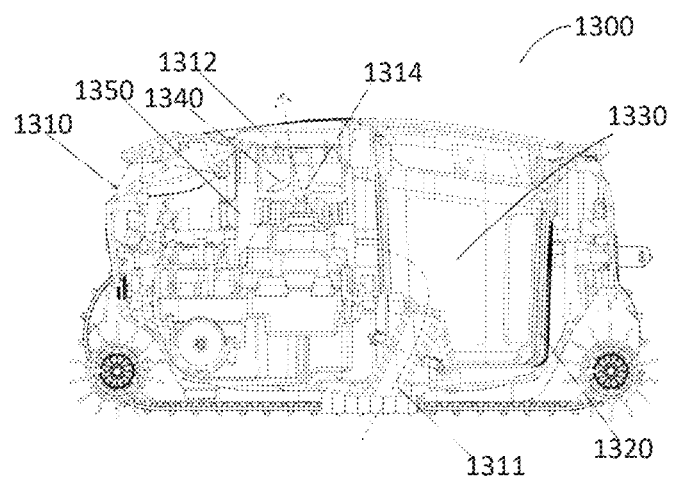
FIG. 13 is a schematic diagram showing a structure of an exemplary automatic pool cleaning apparatus in a third embodiment.
Figure 14:
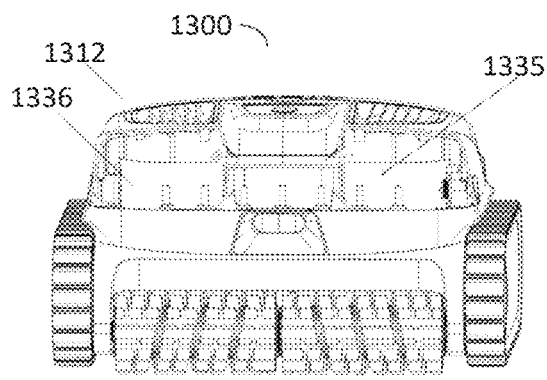
FIG. 14 is a sectional view showing the exemplary automatic pool cleaning apparatus in the third embodiment.
Figure 15:
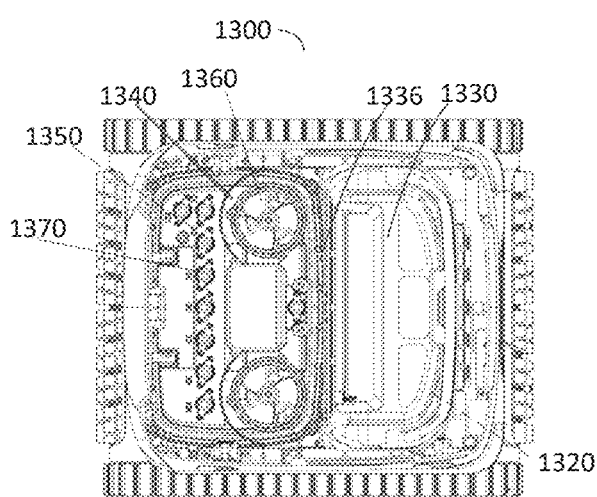
FIG. 15 is a sectional view showing the exemplary automatic pool cleaning apparatus in the third embodiment.

FIGS. 13 to 15 show an exemplary automatic pool cleaning apparatus 1300 according to the third embodiment, which is also referred to as "apparatus 1300" hereafter.

As shown in the figures, the apparatus 1300 may include a housing 1310 and a filter 1320. The housing 1310 has a water inlet 1311 and a water outlet 1312 thereon, and includes inside a chamber 1330 and at least one chamber 1340 and 1350 separated from the chamber 1330. The water inlet 1311, the chamber 1330 and the water outlet 1312 are communicated to form a water flow channel 1314, and the filter 1320 is configured on the water flow channel 1314, for example, in the chamber 1330.

A drainage 1360 may be configured in the chamber 1340 separated from the chamber 1330. The drainage 1360, as one of the water flow conveying components inside the apparatus 100, is configured to guide the water entering the chamber 1330 from the water inlet 1311 to flow out from the water outlet 1312. In the chamber 1350 separated from the chamber 1330, one or more another parts, such as a power supply and a controller, may be configured.

By separating the chamber 1330 inside the housing 1310, making the water inlet 1311, the chamber 1330 and the water outlet 1312 to be communicate to form a water flow channel 1314, and configuring the filter 1320 on the water flow channel 1314, the water in the pool may enter the chamber 1330 from the water inlet 1311, and may be discharged from the water outlet 1312 after being filtered and cleaned by the filter 1320 configured on the water flow channel 1314. The space capacity of the chamber 1330 is smaller than the total capacity of the inner space of the housing 1310, and thus the water flowing into the fuselage of the apparatus 1300 from the water inlet 1311 may be restrained by the chamber 1330, thereby reducing the disorder degree of the water flow and further reducing the fluid resistance, so that the drainage 1360, as one of the water flow conveying components in the apparatus 1300, may convey the water flow with lower energy consumption. Thus, for example, the energy consumption of the apparatus 1300 may be reduced, the endurance performance may be improved, and the cleaning efficiency of the apparatus may be ensured or further improved.

Further, it is usually necessary to take the filter 1320 out of the apparatus 1300 periodically or irregularly, to clean the dirt or garbage filtered or intercepted by the filter 1320. By separating the chamber 1330 inside the housing 1310, configuring the filter 1320 in the chamber 1330, and configuring other parts such as the drainage 1360, the power supply and the controller in the chambers 1340 and/or 1350 separated from the chamber 1330, for example, the internal structure of the apparatus 1300 may become more regular and beautiful visually.

In this embodiment, the apparatus 1300 includes a separator 1335. The separator 1335 may be a cavity or chamber structure, or a cavity or chamber may be enclosed by the separator 1335 and the housing 1310. The separator 1335 is inside the housing 1310 and connected with the housing 1310, thereby separating the chamber 1330 inside the housing 1310.

The space capacity of the chamber 1330 is smaller than the inner space capacity of the housing 1310, thus reducing the range in which water may flow in the apparatus 1300, so that the drainage in the chamber 1340 may guide the water entering the apparatus 1300 from the water inlet 1311 to flow according to the water flow channel 1314 with a relatively small power, and finally make the water discharged to the outside of the apparatus 1300 through the water outlet 1312.

For example, the separator 1335 may be at least partially integrated with the housing 1310. Thus, it is unnecessary to separately install the separator 1335 when assembling the apparatus 1300, which is beneficial to improve the assembly efficiency of the apparatus 1300.

As shown in FIGS. 14 and 15, the separator 1335 includes at least one partition plate 1336, wherein the shape of the partition plate 1336 may semi-surround the outer contour of the drainage. The lateral outer edge of the partition plate 1336 may abut against the inwall of the side surface of the housing 1310, the top outer edge of the partition plate 1336 may abut against the inwall of the top surface of the housing 1310, and the bottom outer edge of the partition plate 1336 abuts against the inner side of the bottom surface of the housing 1310, thereby separating the chamber 1330 inside the housing 1310.

At least one opening and/or gap may be included on the partition plate 1336 and/or at the edge portion of the partition plate 1336 contacting against the inwall of the housing 1310, so that the chamber 1330 may be communicated at least with the chamber 1340, so that water entering the chamber 1330 from the water inlet 1311 may enter the chamber 1340 with at least a part of the drainage mechanism configured inside, through the at least one opening and/or gap according to the water flow channel 1314 (for example).

As shown in FIG. 15, the chamber 1350 separated from the chamber 1340 may be configured as a sealed bin, and for example, the pump part of the drainage and at least one another part 1370, such as the controller and the power supply, may be arranged in the chamber 1350, so that the at least one part 1370 may be protected to alleviate or avoid the influence from water entering the apparatus 1300, thereby prolonging the service life of the apparatus 1300.

The basic principles of the present disclosure have been described above in connection with the embodiments. However, it is appreciated that the advantages, benefits, effects, and so on, which have been mentioned herein, are only examples rather than limitations, and these advantages, benefits, effects, and so on should not be considered as necessary for each embodiment of this disclosure. Further, the foregoing details are only for the purpose of illustration and easy understanding, rather than limitations, and the foregoing details do not limit that the present disclosure must be implemented with the foregoing details.

The block diagrams of devices, apparatuses, equipment and systems involved in this disclosure are only illustrative examples and are not intended to require or imply that they must be connected, arranged or configured in the manners shown in the block diagrams. In different embodiments, these devices, apparatuses, equipment and systems may be connected, arranged or configured in any suitable manners.

Further, wordings such as "including", "comprising" and "having" are open words, which mean and is interchangeable with the wording "including but not limited to". The wordings "or" and "and" herein refer to and may be interchangeable with "and/or" unless the context clearly indicates otherwise. The wording "such as" herein refers to and may be interchangeable with the phrase "such as but not limited to".

It is appreciated that in the apparatuses, equipment and methods of the present disclosure, each component or step may be decomposed and/or recombined. Any decomposition and/or recombination should be regarded as equivalents of the present disclosure.

In this disclosure, modifiers without quantifiers such as "first" and "second" are intended to distinguish different elements/components/circuits/modules/apparatuses/steps, and are not used to emphasize an order, positional relationship, importance, priority level, or the like. Sometimes, modifiers with quantifiers such as "first piece of" and "second piece of" may be used to emphasize the order, positional relationship, importance, priority level and so on for different components/components/circuits/modules/apparatuses/steps.

The foregoing description has been presented for purposes of illustration and description. This description is not intended to limit the embodiments of the present disclosure to the forms disclosed herein. Although several example aspects and embodiments have been described above, those skilled in the art may recognize some variations, modifications, changes, additions and sub-combinations thereof.

What is claimed is:

1. An automatic pool cleaning apparatus, comprising:
a housing having a water inlet and a first water outlet thereon, and having a container arranged inside such that an inner space of the housing is separated into a first chamber and a second chamber, the container comprising a partition plate and a structure with a first opening, wherein the first chamber has an inner space surrounded by the partition plate and the structure with the first opening, and the second chamber comprises a first chamber part and a second chamber part;
a drainage, at least a part of the drainage being arranged in the first chamber part, wherein the water inlet, the first chamber, the first chamber part, the drainage, and the first water outlet are interconnected, and wherein the drainage is configured to drive a water flow to enter the first chamber via the water inlet, to enter the first chamber part from the first chamber via the first opening, and then to flow outside of the automatic pool cleaning apparatus from the second chamber via the first water outlet; and
a filter arranged in the first chamber, wherein the filter is between the partition plate and the drainage, and the partition plate is configured to block water in the second chamber part from directly entering the filter in a direction facing the drainage.

2. The automatic pool cleaning apparatus of claim 1, wherein the second chamber part is at a front of a body of the automatic pool cleaning apparatus.

3. The automatic pool cleaning apparatus of claim 2, wherein a controller or a driver is configured in the second chamber part.

4. The automatic pool cleaning apparatus of claim 2, wherein the second chamber part is configured to be communicated with an external environment of the automatic pool cleaning apparatus, so that water can enter the second chamber part.

5. The automatic pool cleaning apparatus of claim 1, wherein the partition plate contacts against an inwall of the housing to separate the first chamber inside the housing.

6. The automatic pool cleaning apparatus of claim 1, wherein both a first side of the filter closest to the second chamber part and a second side of the filter closest to the drainage are is configured to filter the water flow entering the first chamber via the water inlet.

7. The automatic pool cleaning apparatus of claim 6, wherein the partition plate is configured to block water in the second chamber part from directly entering the first side of the filter.

8. The automatic pool cleaning apparatus of claim 1, wherein the housing further has at least one second water outlet thereon, and the container further has at least one second opening on its side or bottom, the at least one second opening being interconnected with the at least one second water outlet.

9. The automatic pool cleaning apparatus of claim 8, wherein the at least one second water outlet and/or the at least one second opening have a one-way valve disposed thereon.

10. The automatic pool cleaning apparatus of claim 8, wherein the at least one second water outlet is disposed on at least one of a bottom and a side of the housing.

11. The automatic pool cleaning apparatus of claim 8, wherein the second chamber part is at a front of a body of the automatic pool cleaning apparatus.

12. The automatic pool cleaning apparatus of claim 8, wherein the side with the at least one second opening is between the partition plate and the structure with the first opening.

13. The automatic pool cleaning apparatus of claim 1, wherein the first opening is between the filter and the drainage.

14. The automatic pool cleaning apparatus of claim 1, wherein the first chamber has a third opening disposed on its bottom, the third opening corresponding to or being interconnected with the water inlet.

15. The automatic pool cleaning apparatus of claim 14, wherein the third opening is interconnected with the water inlet via a water flow guiding pipe.

16. The automatic pool cleaning apparatus of claim 15, wherein at least a part of the water flow guiding pipe is outside the first chamber.

17. The automatic pool cleaning apparatus of claim 14, wherein the filter has a fourth opening corresponding to or being interconnected with the third opening.

18. The automatic pool cleaning apparatus of claim 1, wherein at least a part of the drainage and/or a water discharging direction of the drainage faces the first water outlet.

19. The automatic pool cleaning apparatus of claim 1, wherein the first water outlet is disposed at a top and/or a side of the second chamber.

20. The automatic pool cleaning apparatus of claim 1, wherein at least a part of the drainage faces the first opening.

21. The automatic pool cleaning apparatus of claim 1, further comprising:
a power supply and a controller, both being disposed in at least one third chamber separated from the first chamber and the second chamber in the housing.

22. The automatic pool cleaning apparatus of claim 1, wherein a distance between the filter and an inwall of the first chamber is less than 35 millimeters.

23. The automatic pool cleaning apparatus of claim 1, wherein the partition plate has no opening.

24. The automatic pool cleaning apparatus of claim 1, wherein the drainage comprises a pump.

25. The automatic pool cleaning apparatus of claim 24, wherein the pump and the second chamber part are not interconnected.

26. The automatic pool cleaning apparatus of claim 1, wherein the filter is a filter box, and the container is configured to be a box shape.

27. The automatic pool cleaning apparatus of claim 26, wherein the partition plate is configured to block water in the second chamber part from directly entering the top and bottom of the filter in the direction facing the drainage.

28. The automatic pool cleaning apparatus of claim 1, wherein the first opening is facing the partition plate.

* * * * *